June 9, 1959     R. A. BROOKING     2,889,702
DENSITOMETERS
Filed June 19, 1957     2 Sheets-Sheet 1
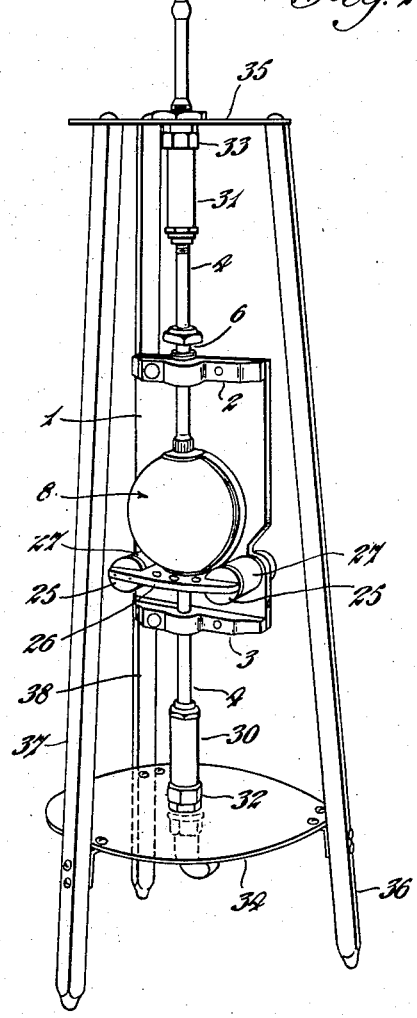
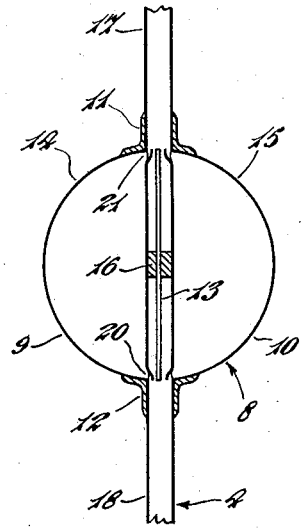
INVENTOR
ROWLAND A BROOKING
BY
ATTORNEYS

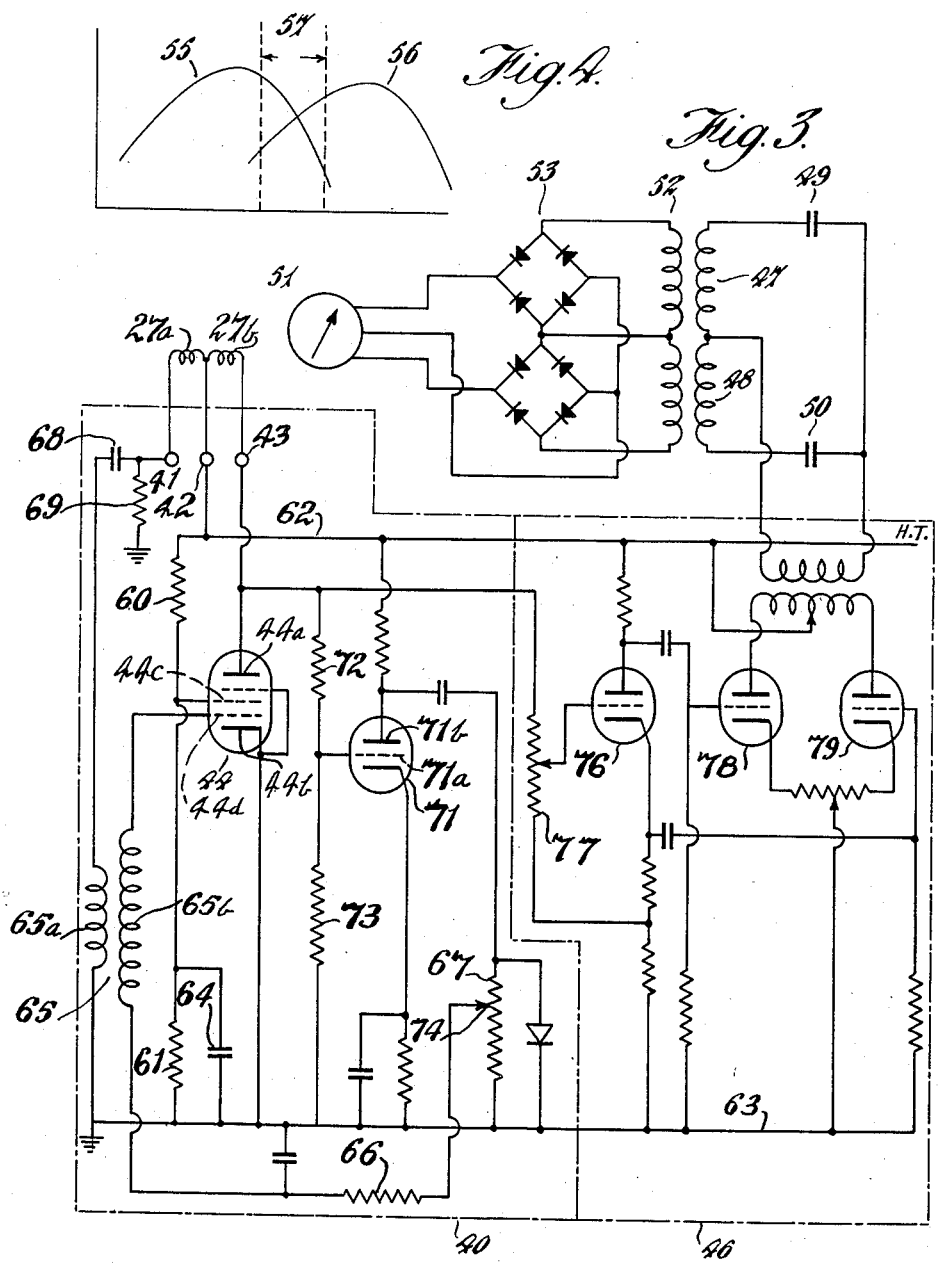

2,889,702
Patented June 9, 1959

2,889,702
DENSITOMETERS

Rowland Arthur Brooking, Abercynon, Wales, assignor to Simmonds Aerocessories Limited, near Pontypridd, Wales Application June 19, 1957, Serial No. 666,645

Claims priority, application Great Britain June 19, 1956

5 Claims. (Cl. 73—32)

This invention relates to liquid densitometers, and more particularly to densitometers capable of providing a continuous signal dependent on the density of a liquid which may be moving or stationary.

In co-pending application No. 557,573 there is claimed a liquid densitometer comprising a support, hollow member mounted for vibration with respect to the support on one or more supporting elements resilient at least in part and carried by the support remote from the connection of the element(s) with the hollow member, the hollow member being such as not to flex appreciably on vibration, means enabling the continuous passage of liquid into and out of the hollow member said member being completely full of liquid during operation of the densitometer, means for vibrating the hollow member with respect to the support at the natural frequency of vibration, and means to provide an electric signal having a characteristic dependent on the frequency of said vibration and thereby on the density of the liquid.

In a preferred form of this densitometer the vibrating means is electrical and comprises one or more electrical element which form, or form part of, said signal-providing means and are adapted to provide a signal having a frequency proportional to the frequency of vibration.

The main object of the present invention is to provide an improvement in or modification of this densitometer which, in some respects, has advantages over some of the specific forms of densitometer described in the complete specification of the above application.

The invention accordingly provides a densitometer such as specified above in which the hollow member comprises a hollow sphere, the supporting elements comprise a pair of tube portions of resilient material each secured to the sphere and clamped remote therefrom to a rigid base, said tube portions providing also the means for passing liquid into and out of the sphere, the sphere and tube portions being arranged whereby the centre of the sphere lies on a common axis of the tube portions and is located intermediate the points at which they are clamped, and the vibrating means are arranged to cause angular oscillation of the sphere about said axis against the torsional resistance of the tube portions, means being provided to cause liquid within the sphere to oscillate substantially similarly to the sphere itself.

The tube portions are conveniently provided by a single straight tube clamped in a vertical position near its ends and carrying the sphere mid-way between the points at which it is clamped, the tube having transverse bores within the sphere and being blocked between said bores whereby liquid is forced to circulate in the sphere on its passage through the densitometer.

A preferred embodiment of the invention will now be described by way of example with reference to the accompanying diagrammatic drawings, in which:

Figure 1 is a perspective view of a liquid densitometer apart from the electrical parts;

Figure 2 is a schematic section of part of the densitometer;

Figure 3 is a circuit diagram of the electrical parts of the densitometer, and

Figure 4 is a graph.

Referring to Figures 1 and 2, a relatively massive rigid vertically-arranged supporting plate 1 carries stout horizontally-extending mounting blocks 2, 3 at top and bottom and a straight uniform metal tube designated generally 4 is clamped to the mounting blocks so as to extend vertically therebetween and for some distance beyond each block. At the upper mounting block 2 clamping is effected by an externally threaded collet 6 screwed into a threaded bore in the mounting block whereby the tube may be released, the collet screwed in or out, and the tube re-clamped at a different point.

A sphere designated generally 8 of thin metal or other rigid material (conveniently beryllium copper of .015" thickness or, better, aluminium) is made in two halves 9, 10 fitting together on a diametral plane containing the axis of the tube 4 and secured symmetrically about the tube mid-way between the clamping blocks 2, 3 by a pair of end caps 11, 12 threaded over the tube and fixed thereto. A light rigid metal bulkhead 13, which may also be of beryllium copper .015" thick and is corrugated to strengthen it, is sandwiched between the two halves 9, 10 of the sphere 8 before they are finally secured together, the bulkhead dividing the interior of the sphere to form two equal hemispherical chambers 14, 15. The tube is blocked by a plug 16 at its mid point and thereby divided into equal upper and lower portions 17, 18. Transverse bores 20, 21 are formed in the tube immediately within the sphere 8 for flow of liquid from the lower tube portion 18 into each chamber 14, 15 and from each chamber into the upper tube portion 17 (flow being arranged as will be seen below to take place upwards).

A magnetically soft armature 25 is carried by either arm of a rigid but light yoke 26 secured to the lower end cap 12 and disposed symmetrically with respect to the supporting plate 1. A pair of electromagnets 27a and 27b is mounted on the supporting plate 1 to complete a magnetic circuit with the armatures 25, and the coils of the electromagnets are connected in the oscillator circuit described below. The electromagnet cores are preferably permanently magnetic to avoid variation in the restoring forces. However D.C. excitation could be used instead.

The tube 4 is supported vertically by stout flexible pipe sections 30, 31 (e.g. of rubber) connected at one end to the tube and at their other end to fixed inlet and outlet connections 32, 33; these are in turn carried by rigid horizontal plates 34, 35 secured at their edges to supporting legs 36, 37, 38. In operation of the densitometer liquid flows continuously up the tube 4 and through the sphere 8 (which is always completely full during operation), and the sphere and base plate 1 (which is not of infinite mass) vibrate angularly. The flexible pipe sections 30, 31 are provided to lead liquid through the tube 4 without damping its angular vibration more than can be helped, and they are connected to the tube in the region of nodes for the same reason. At the cost of some damping it would however be possible to dispense with the tube sections 30, 31 and clamp the tube 4 to fixed liquid connections at the nodes.

The oscillator circuit 40 for vibrating the sphere, illustrated in Figure 3, comprises terminals 41, 42, 43 which receive leads (not shown) connected to the coils of the electromagnets (shown diagrammatically in Figure 3), electromagnet 27a being connected across terminals 41, 42 and electromagnet 27b across terminals 42, 43. Terminal 43 is connected to the plate 44a of a pentode amplifier valve 44 having its cathode 44b connected to earth. The screen grid 44c of the valve 44 is connected between resistors 60, 61 forming a potential divider between H.T. and earth lines 62, 63, respectively, resistor 61 having in parallel a decoupling capacitor 64. The control grid 44d of the valve 44 is connected through the secondary 65b of a coupling transformer 65 to the earth line 63 through resistor 66 and variable resistor 67, the primary 65a of the transformer being connected between the earth line and the terminal 51 through a blocking capacitor 68. A resistor 69 provides a D.C. path for polarizing current through the electromagnets 27a, 27b capacitor 68 preventing shorting of this current through the transformer primary 65. Terminal 42 is connected to the H.T. line 62.

The oscillator circuit 40 as so far described is essentially a Meissner oscillator, the coupling between the anode and grid circuits being affected by the mechanical vibrating system. Hence, given correct circuit conditions, the mechanical system oscillates at its natural frequency of vibration as determined by the elastic and inertial characteristics of the system.

In more detail, when the circuit is put into operation, random fluctuations in anode current of the valve 44 produce random pulls on the armature 25 by electromagnet 27b, thus stimulating the mechanical system to vibrate at its natural frequency.

The vibration induces an E.M.F. in the electromagnet 27a which is fed back through the coupling transformer 65 to the grid 44d of the valve 44. The valve is arranged to increase the fluctuations in the anode current and hence the pulls on the armature 25 by electromagnet 27b.

To avoid oscillations of excessive amplitude such as might bring the armatures 25 and electromagnets 27a, 27b into contact, an automatic volume control (A.V.C.) network is included in the oscillator circuit, this network comprising a triode 71 connected through resistors between the H.T. and earth lines 62, 63 the grid 71a of the triode 71 being connected to a potential divider consisting of resistors 72, 73 connected between the plate 44a of the oscillator amplifier valve 44 and earth. The plate 71b of the A.V.C. triode 71 is connected to one terminal of the resistor 67, the other terminal of which is earth-connected. Increasing plate current in the valve 44 corresponding to increasing amplitude of oscillation lowers the voltage at the plate 44a and thereby reduces the plate current in the A.V.C. triode 71; this, in turn, reduces the potential at the point 74 to which the transformer secondary 65b is connected. The effect of this is to make the bias at grid 44d more negative, so reducing plate current and amplitude.

The plate 44a of valve 44 is also connected to an output stage driver triode 76 through a variable resistor 77, the triode 76 being connected through resistors between the H.T. and earth lines 62, 63 and feeding a pair of triodes 78, 79 connected in push-pull, the combination of output stage 76 and triodes with their associated components being designated 46. The output from the circuit 46 is fed to a pair of resonant circuits formed by coil turns 47, 48, and capacitors 49, 50 which circuits are stagger-tuned and feed the two arms of a ratiometer 51 through a secondary coil 52 and rectifier networks 53. The resonant circuits 47, 49 and 48, 50 are tuned to produce the relation between input frequency and current which is shown in Figure 4, the curves 55, 56 showing as ordinates the currents in each circuit respectively. The range 57 (which covers the substantially linear portions of the resonance curves but does not come close to resonance) corresponds to fullscale deflection i.e. the range between the lowest and the highest density which the densitometer is required to measure (e.g. 0.6 to 0.9 c.g.s. units for use of the densitometer with aircraft fuels), and the ratiometer is calibrated directly in terms of density over this range. These remarks apply, of course, only for a fixed adjustment of the collet 6. It may be desirable to adjust the collet during setting up of the densitometer.

Other circuits could be used, e.g. that disclosed in Figure 3 of copending application No. 557,573. An alternative circuit comprises a triode connected with an anode resistor between H.T. and earth and having the driving coils connected, each through a small capacitor, between the anode and grid respectively on one side and on the other side to earth. The signal at the anode has the frequency of the vibration and can be used as desired. It will be understood that a frequency measurement, as such, is not necessary, and the signal could be made, by a suitable electronic arrangement such as the ratiometer circuit of Figure 3, to give a direct density reading. Alternatively the signal can be used to control a device in dependence on density, e.g. by a servomotor.

Whatever circuit is used vibrates the sphere and the liquid in it angularly about the axis of the tube against the torsional resistance of the tube (or rather, of the free lengths thereof between the clamping blocks 2, 3 and end caps 11, 12), this vibration taking place at the natural frequency of the system. The frequency $f$ related to the liquid density $\rho$ substantially as follows:

$$f \propto \sqrt{\frac{1}{\rho}}$$

The density of the liquid can thus be found.

The densitometer just described has the following advantages:

(1) The sphere can be lighter than a hollow member of any other shape for a given volume and liquid pressure.

(2) The arrangement enables flow substantially without any stagnant liquid.

(3) Vibrations are simple harmonic for comparatively large amplitudes.

(4) The moment of inertia of the vibrating system is less for a given liquid mass than with any other practical shape of hollow member and mode of vibration thereof, and higher frequencies can thus be achieved. Theoretically a toroidal hollow member would give the best results, but the necessary supports and connections would make it very cumbersome and inferior to the sphere described.

(5) The densitometer can be constructed easily to a high degree of accuracy.

(6) The frequency of vibration can be adjusted by means of the collet.

It is not necessary that the sphere be supported midway between the mounting blocks, and it is sometimes preferable to have the tube portions on either side of unequal length.

I claim:

1. A liquid densitometer comprising a rigid base; two fixing members extending to the same side of the base at spaced locations thereon; a substantially rigid hollow sphere; two straight coaxial tube portions of resilient material each rigidly secured to one of the fixing members and extending therebetween, the tube portions being rigidly secured to the hollow sphere remote from the fixing members supporting said sphere intermediate said members with its center upon the axis of the tube portions and providing liquid inlet and outlet means for the sphere; wherein one of the tube portions being adjustably clamped to the base whereby the free length of that tube portion and the frequency of vibration can be varied; means for vibrating the hollow sphere relatively to the base against restoring forces due to torsional stress in the tube portions; means rigid with sphere and within it to cause liquid within the sphere to oscillate substantially similarly to the sphere itself; and means to provide an electric signal having a characteristic dependent on the frequency of vibration and thereby on liquid density.

2. A liquid densitometer comprising a rigid base; two fixing members extending to the same side of the base at spaced locations thereon; a substantially rigid hollow sphere; two straight coaxial tube portions of resilient material each rigidly secured to one of the fixing members and extending therebetween, the tube portions being rigidly secured to the hollow sphere remote from the fixing members supporting said sphere intermediate said members with its center upon the axis of the tube portions and providing liquid inlet and outlet means for the sphere; said sphere being made in two halves secured together on a diametral plane including said axis of the tube portions and the liquid oscillating means is a rigid bulkhead clamped between said sphere halves; means for vibrating the hollow sphere relatively to the base against restoring forces due to torsional stress in the tube portions; means rigid with said sphere and within it to cause liquid within the sphere to oscillate substantially similarly to the sphere itself; and means to provide an electric signal having a characteristic dependent on the frequency of vibration and thereby on liquid density.

3. A liquid densitometer comprising a rigid base; a rigid hollow sphere; two straight resilient coaxial tube portions each rigidly secured to the base at spaced locations thereon and rigidly secured to the hollow sphere remote from and between said locations whereby to support the sphere with its center upon the axis of the tube portions, said tube portions providing a liquid inlet and a liquid outlet to the sphere; means rigid with the sphere and within it to cause liquid in the sphere to vibrate therewith; an armature rigid with the sphere and extending either side of the axis; electromagnets mounted rigidly with the base and co-operating with the armature; an oscillator circuit electrically connecting the electromagnets to oscillate the sphere at its natural frequency of vibration; and a connection to the circuit to provide a signal dependent on the frequency of vibration and thereby on liquid density.

4. A direct reading liquid densitometer as claimed in claim 3, further comprising an amplifier connected to said signal-providing connection, interconnected stagger-tuned resonant circuits fed by the amplifier, and a density-calibrated ratiometer having a pair of arms supplied by said resonant circuits.

5. A liquid densitometer as claimed in claim 3, wherein the tube portions are provided by a single straight tube clamped in a vertical position near its ends and carrying the sphere mid-way between the points at which it is clamped, the tube having transverse bores within the sphere and being blocked between said bores whereby liquid is forced to circulate in the sphere on its passage through the densitometer.

References Cited in the file of this patent

UNITED STATES PATENTS

| | | |
|---|---|---|
| 2,290,327 | Hansell | July 21, 1942 |
| 2,635,462 | Poole et al. | Apr. 21, 1953 |
| 2,733,597 | Hardy | Feb. 7, 1956 |
| 2,754,676 | Poole | July 17, 1956 |